H. R. DUGGER.
DEMOUNTABLE RIM.
APPLICATION FILED FEB. 1, 1918.

1,270,711.

Patented June 25, 1918.
2 SHEETS—SHEET 1.

WITNESSES

Inventor
H. R. Dugger,
By Victor J. Evans
Attorney

H. R. DUGGER.
DEMOUNTABLE RIM.
APPLICATION FILED FEB. 1, 1918.
1,270,711.
Patented June 25, 1918.
2 SHEETS—SHEET 2.
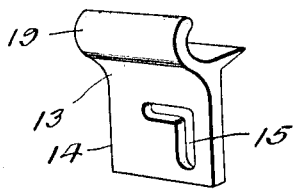
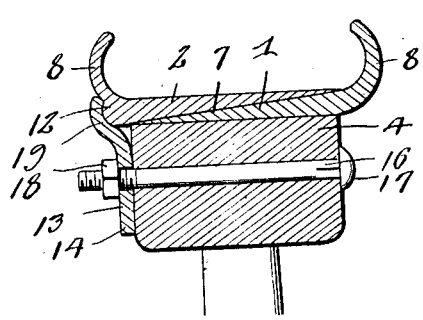
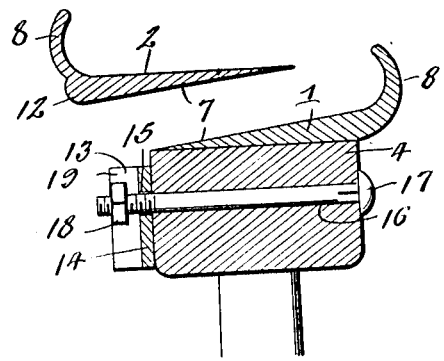
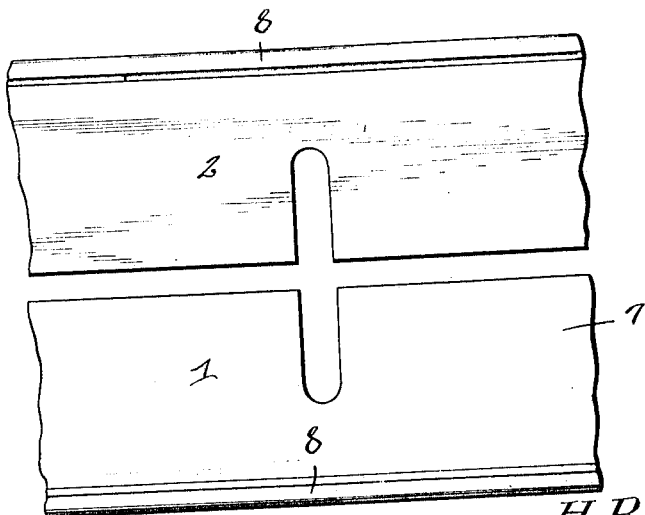
WITNESSES
Inventor
H. R. Dugger
By Victor J. Evans
Attorney

UNITED STATES PATENT OFFICE.

HUSTON R. DUGGER, OF MURPHY, TEXAS.

DEMOUNTABLE RIM.

1,270,711.

Specification of Letters Patent.   Patented June 25, 1918.

Application filed February 1, 1918.   Serial No. 214,970.

*To all whom it may concern:*

Be it known that I, HUSTON R. DUGGER, a citizen of the United States, residing at Murphy, in the county of Collin and State of Texas, have invented new and useful Improvements in Demountable Rims, of which the following is a specification.

This invention relates to demountable rims for motor vehicles.

The object of the invention is to provide a particularly simple, effective and reliable rim which is of sectional construction and which is also demountable in relation to the wheel in conjunction with which it is used.

The main object of the invention is to produce a demountable rim embodying two sections having an overlapping relation to each other combined with a plurality of latches pivotally attached to one section of the rim and adapted to be moved into detachable locking engagement with the other section of the rim, enabling a pneumatic or other tire to be easily applied to and removed from the rim.

With the above and other objects in view, the invention consists in the novel construction, combination and arrangement of parts, as herein described, illustrated and claimed.

In the accompanying drawings,

Fig. 4 is a detail view of one of the clamps.

Fig. 5 is a cross section similar to Fig. 2 showing a modified form of the rim.

Fig. 6 is a similar view showing the parts of the rim separated.

Fig. 7 is a fragmentary plan view of the rim sections showing the provision for receiving the valve tube or casing.

Figure 1:
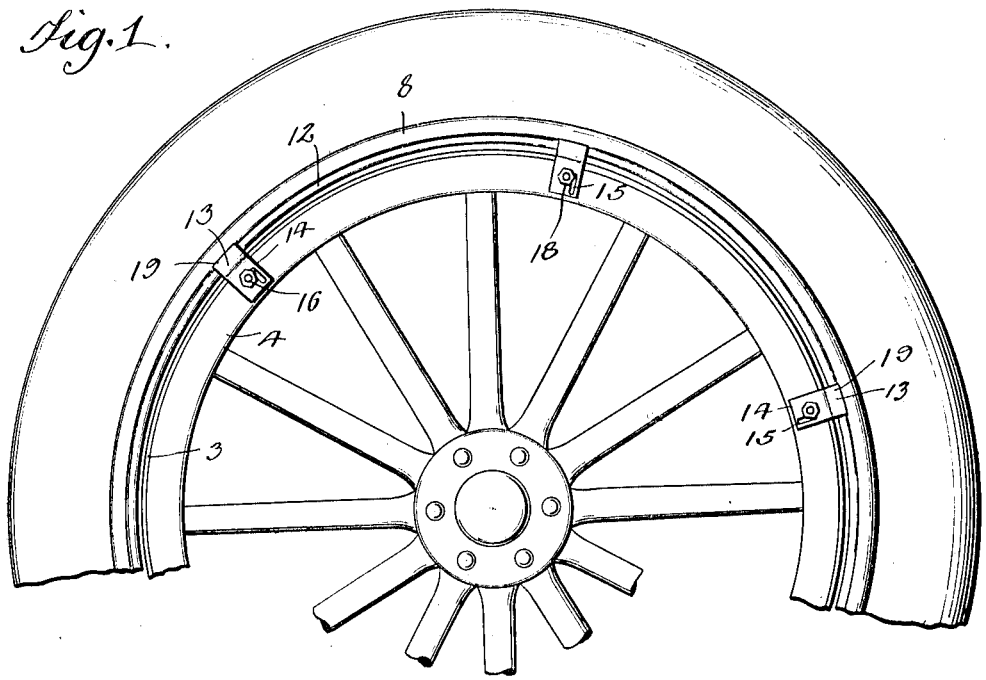
Figure 1 is a fragmentary side elevation of a vehicle wheel showing the improved demountable rim and a tire thereon.
Figure 2:
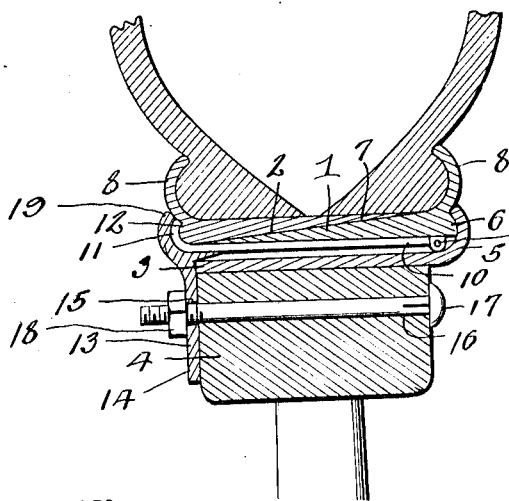
Fig. 2 is an enlarged cross section through the same.
Figure 3:
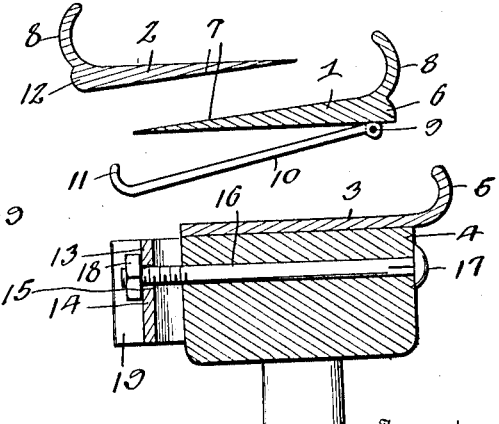
Fig. 3 is a similar section with the parts separated.

The demountable rim contemplated in this invention, comprises a base section 1 and an overlying section 2. The base section 1 is adapted to rest upon and surround a metal band or hoop 3 which encircles the felly 4 of the wheel and is fastened thereto by any means. The band 3 is provided at the inner side of the wheel with a stop flange 5 which is curved in cross section as shown so as to embrace and engage a rounded or bulged shoulder 6 on the base section 1 of the rim.

The meeting faces of the sections 1 and 2 of the rim are laterally inclined or beveled as shown at 7 so as to produce a wedging fit of one section upon the other when they are crowded together. Each of the sections 1 and 2 of the rim is provided with a tire engaging flange 8 which may be designed either to engage and hold a clencher tire or a straight sided tire.

Connected to the base section 1 of the rim by means of pivots 9 are latches 10. These latches extend transversely of the inner face of the base section 1 of the rim and are pivotally connected thereto adjacent to the shoulder 6. Each latch, at its opposite free end is formed with a hook 11 which is adapted to interlock with a rounded bulging shoulder 12 on the superimposed or outer section 2 of the rim. When the latches 10 are so engaged with the section 2 of the rim, the sections are prevented from spreading apart laterally and the higher the degree of inflation of the tire, the more securely will the latches 10 hold the sections of the rim together.

The means for fastening the demountable rim to the wheel, comprises a plurality of clamps 13 each of which is formed with an inwardly extending portion 14 having an L-shaped slot 15 through which is inserted a bolt 16 having a head 17 at one end and a nut 18 at the other end, said nut bearing against the clamp 13. At its outer end the clamp 13 has an outwardly and upwardly curving shoulder 19 which is designed to engage the hooked end portion 11 of the adjacent latch 10. By the means described, the demountable rim is securely fastened to the wheel but may be removed by loosening the nuts 18 and turning the clamps 13 to one side, this being permitted by the slots 15. The rim, carrying the tire, may then be slipped laterally off the wheel, and by deflating the tire the latches 10 may be swung out of engagement with the outer section 2 of the rim. The sections of the rim may then be separated and the tire removed. To replace the tire and again mount the rim on the wheel, the operation just hereinabove described is reversed.

I claim:

A demountable rim embodying an inner section and an outer section of approximately equal transverse extent, said sections having laterally inclined meeting faces, and a plurality of latches extending transversely of the inner face of the inner section of the rim, and lying in contact therewith, each of said latches being pivotally connected to the inner section of the rim adjacent to one of the side edges thereof and being provided at its free end with a hook to engage the opposite side edge of the outer section of the rim, said outer section of the rim having a bulging shoulder for engagement with the hook of the latch.

In testimony whereof I affix my signature.

HUSTON R. DUGGER.